United States Patent [19]
Ha et al.

[11] Patent Number: 6,049,446
[45] Date of Patent: Apr. 11, 2000

[54] ALARM SYSTEMS AND DEVICES INCORPORATING CURRENT LIMITING CIRCUIT

[75] Inventors: Simon Ha, Aurora; Andy Chud, Geneva, both of Ill.

[73] Assignee: Pittway Corporation, Chicago, Ill.

[21] Appl. No.: 08/868,883

[22] Filed: Jun. 4, 1997

[51] Int. Cl.[7] .................................................. H02H 9/00
[52] U.S. Cl. ........................ 361/58; 361/110; 340/653
[58] Field of Search ............................. 361/58, 111, 91.3, 361/91.5, 91.6, 91.7, 110; 340/635, 653, 654, 660, 661, 664

[56] References Cited

U.S. PATENT DOCUMENTS

| | | | |
|---|---|---|---|
| 4,860,148 | 8/1989 | Iwamura et al. | 361/58 |
| 4,916,432 | 4/1990 | Tice et al. | 340/518 |
| 5,179,488 | 1/1993 | Rovner | 361/18 |
| 5,187,653 | 2/1993 | Lorenz | 363/89 |
| 5,598,139 | 1/1997 | Karim et al. | 340/286.11 |
| 5,793,589 | 8/1998 | Friedl | 361/58 |
| 5,886,431 | 3/1999 | Rutigliano | 307/131 |

*Primary Examiner*—Michael J. Sherry
*Attorney, Agent, or Firm*—Rockey, Milnamow & Katz, Ltd.

[57] ABSTRACT

Electrical modules which incorporate multiple state input circuitry limit the in-rush current thereto when electrical energy is initially applied. The input circuitry exhibits a high impedance and subsequently a very low impedance state. When electrical energy is first applied, the high impedance state limits the in-rush current to an acceptable predetermined maximum value. Subsequently, in response to either elapsed time or an electrical parameter such as current flow, the circuit switches to a low impedance state which results in its having no material effect on the operation of the module. The module can incorporate a visual alarm indicating output device, an audible alarm indicating output device or both. The output indicating devices can be synchronized by applied control signals. The output devices can be controlled independently by means of either pulse width modulated control signals or by means of patterns of control pulses.

33 Claims, 4 Drawing Sheets

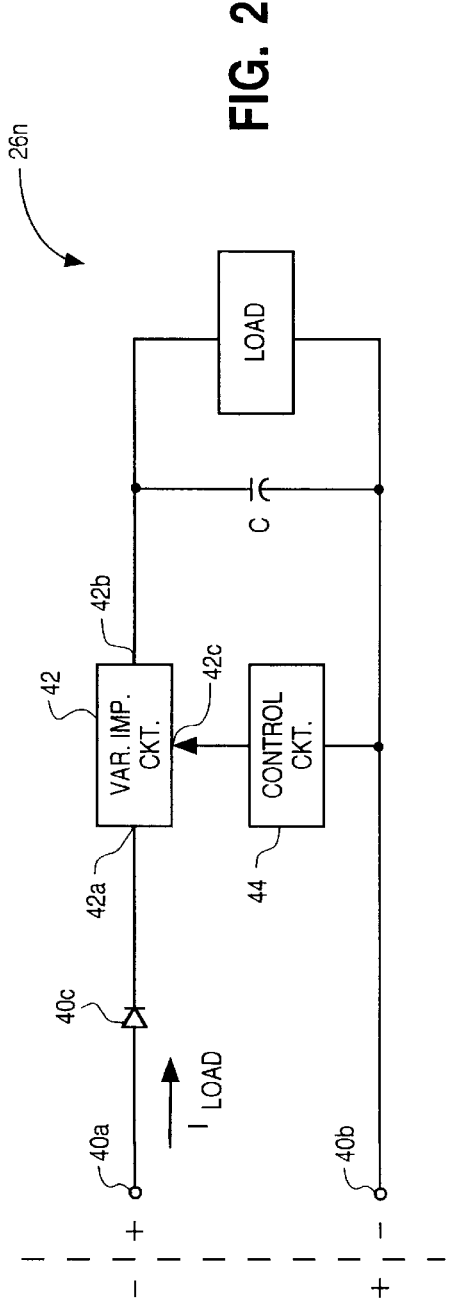
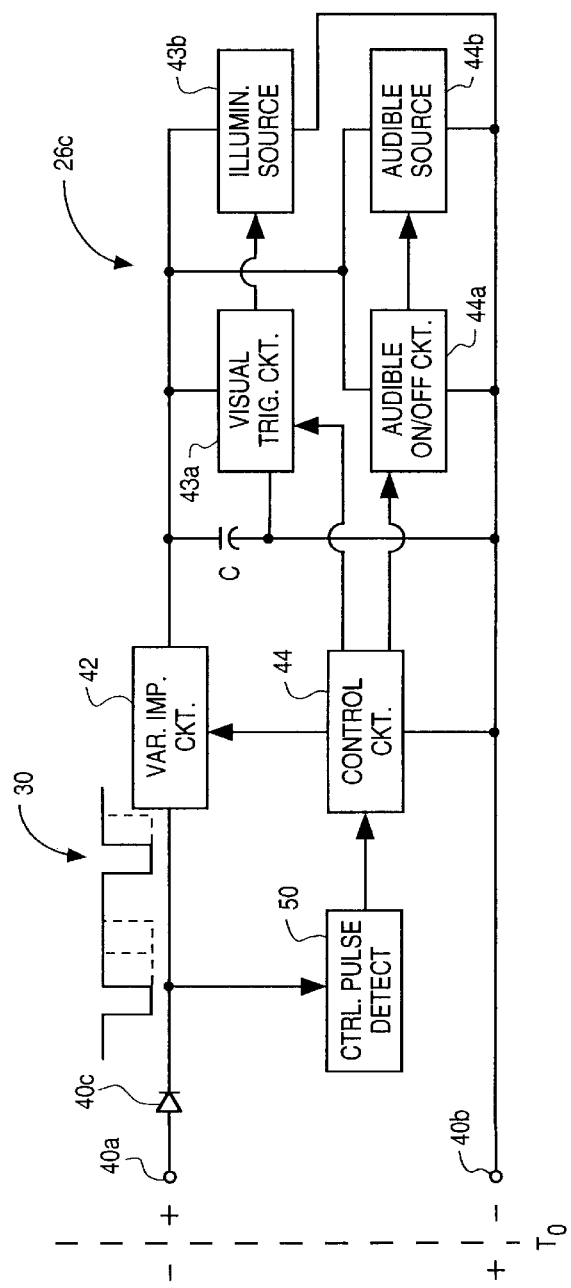

ALARM SYSTEMS AND DEVICES INCORPORATING CURRENT LIMITING CIRCUIT

FIELD OF THE INVENTION

The invention pertains to systems and devices for providing outputs in the presence of selected conditions. More particularly, the invention pertains to visual and audible alarm indicating output devices which incorporate current limiting circuitry.

BACKGROUND OF THE INVENTION

Ambient condition detection systems, such as fire alarm systems, are often incorporated into commercial and industrial buildings for the protection of people and property in the respective buildings in the event of a fire. Such systems often incorporate one or more ambient condition detectors which are capable of detecting the presence of a selected condition, such as smoke, temperature, flame or toxic gases. The presence of the selected condition or conditions is often indicative of the presence of a potential fire. In such an instance, it is important to be able to provide audible and/or visual indications of an alarm condition in the region being supervised.

Devices which provide the discernable alarm indicating outputs such as strobe lights, sirens or the like are usually maintained in an unenergized state until an alarm condition has been detected. Once an alarm condition has been detected, the units are energized, usually by reversing the plurality of the associated energy supply, and thereupon start to function in their normal fashion.

Since the alarm indicating output units often need to be located at sites remote from a control unit which incorporates the driving power supplies or energy sources, electrical cables are used to interconnect the output devices with the control unit. The electrical cables at times are required to run substantial distances depending on the size of the region being supervised. In addition, there may well be a need for a relatively large number of output devices to insure adequate coverage over large regions.

Installation problems in such systems are compounded by the fact that the output devices often have an input impedance with a highly capacitive component. As such, when the electrical plurality to the devices is reversed, there can be a substantial transient in-rush current at each device. This in-rush current can far exceed the normal steady state current requirements for the device. The initial in-rush current imposes additional current requirements on the power supplies and also on the associated transmission cables.

Prior solutions to the in-rush current problem have not been as cost effective as desired. These have included incorporating higher capacity, more expensive power supplies into the control unit for the purpose of driving the output devices. Other attempted solutions have limited the number of devices on a given set of transmission cables. Alternately, the current carrying capacity of the transmission lines has been increased.

Hence, there still continues to be a need for cost-effective solutions to the in-rush current problem. Preferably, such solutions would enable installers to connect larger numbers of output devices to a common transmission cable without the need for increasing power supply size or cable size just to deal with the in-rush current problem. Preferably, such solutions could be incorporated into output devices which would exhibit lower initial in-rush currents and which could be used to retrofit existing systems thereby providing improved performance thereto.

SUMMARY OF THE INVENTION

Electrical modules which exhibit relatively low, controllable in-rush currents when initially energized incorporate variable impedance input circuitry. This circuitry exhibits a first, relatively high, input impedance state when the module is initially energized. This limits peak in-rush currents to relatively low values comparable to steady stay operating values.

In response to a predetermined condition, the variable impedance circuit subsequently switches to a second, substantially lower, impedance state. When in the second impedance state the variable impedance circuit has no material effect on module performance.

In one aspect, the variable impedance circuitry can be implemented as a single branch having a variable impedance switching element therein. The switching element could, for example, be implemented as a solid state switch.

In another aspect, the variable impedance circuitry can include first and second branches. One of the branches will incorporate, in this embodiment, a fixed resister of a selected value which is intended to limit peak in-rush current values. A second branch, coupled in parallel to the first branch, incorporates a variable impedance switching element.

The variable impedance switching element can be switched from an essentially open circuited state (very high impedance) to an essentially short circuited state (very low impedance) in response to a control signal. In the latter state, the variable impedance circuit has no effect on module operation.

Switching elements can implemented using MOS FET type solid state switches. Other types of solid state switches can also be used.

Where the module corresponds to a visual alarm indicating output device, an included strobe light can be triggered in a synchronous fashion to provide a plurality of alarm indicating, synchronized, output light flashes. In another aspect, the module can incorporate an audible alarm indicating output device such as a horn.

In yet another aspect, the strobe light and the horn can both be independently controlled by means of control signals provided via the conductors which link the module to the power supply. The control signals can take the form of pulse width modulated signals. Alternately, various types of pulse sequences can be used to effect the desired control of the output devices.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 2 is a block diagram of an electrical module which incorporates current limiting circuitry;

FIG. 3 is a block diagram of the module of FIG. 2 configured in the form of an output device useable in the system of FIG. 1;

DETAILED DESCRIPTION OF THE PREFERRED EMBODIMENTS

Figure 1:
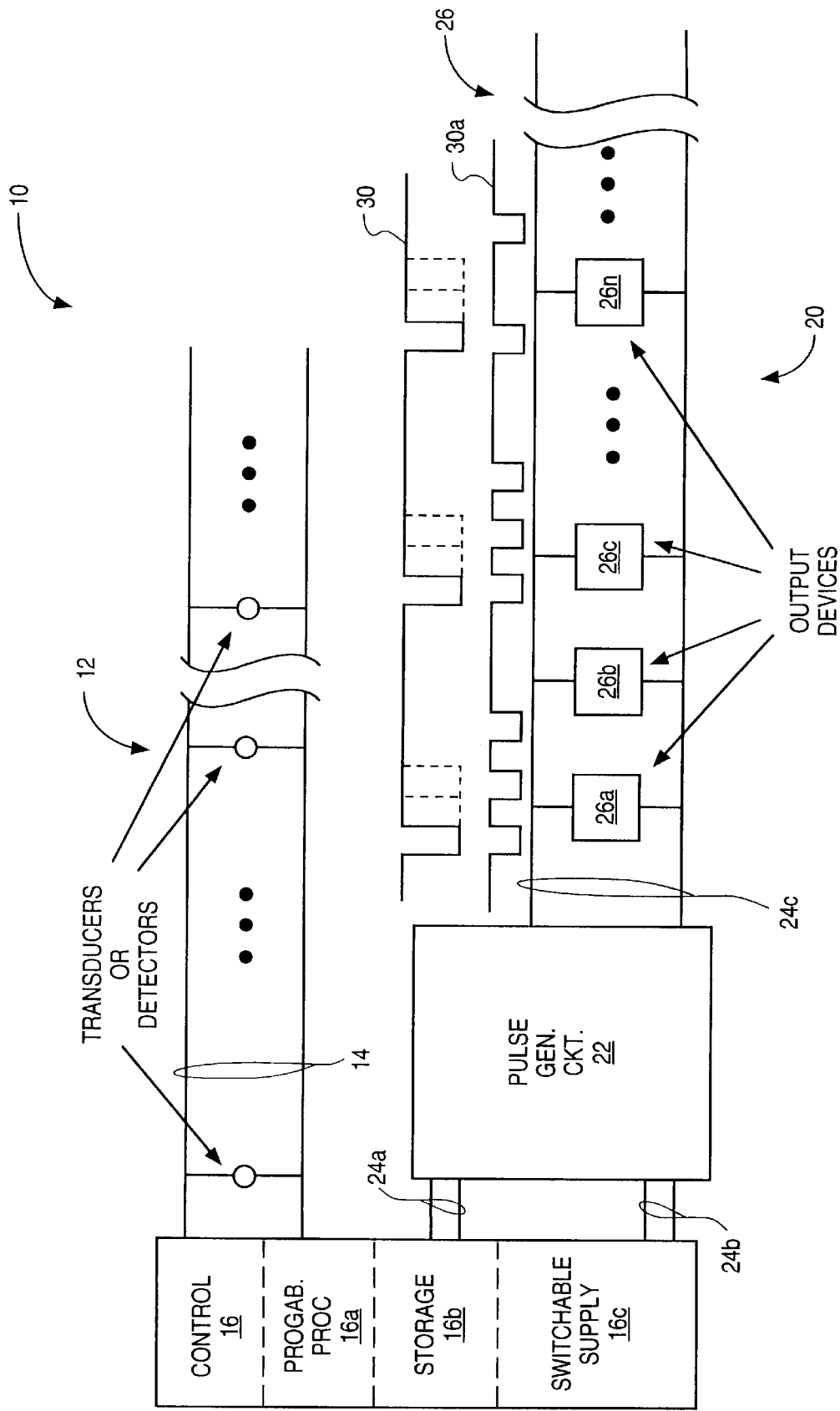
FIG. 1 is a block diagram of an alarm system which incorporates a plurality of detectors as well as alarm indicating output devices.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates an ambient condition detection system 10, which could be an alarm system. The system 10 includes, for example, a plurality of spaced apart transducers or detectors 12. The detectors 12 could include smoke detectors, heat detectors, flame detectors or gas detectors without limitation.

The detectors 12 are coupled via communication link 14, which could be bidirectional, to a common control element 16. One such system of the above-described type is disclosed and claimed in Tice U.S. Pat. No. 4,916,432 entitled Smoke and Fire Detection Communication assigned to the assignee hereof and incorporated herein by reference.

The control element 16 as will be understood by those of skill in the art could include a programmable processor, associated memory and control programs stored therein for the purpose of communicating with the transducers 12 and for making a determination that an alarm condition is present. In the event that the element 16 determines that an alarm condition, which might be a fire, is present, it activates an output indicating system 20 which is intended to provide both visual and audible indications of the alarm condition.

The system 20 includes a pulse generator 22 which is coupled to first and second sets of control lines 24a and 24b associated with control element 16. It will be understood that the generator 22 could be incorporated into and made an integral part of the element 16 without departing from the spirit and scope of the present invention.

Control lines 24a carry signals from the control element 16 for turning on and off various of the output devices as described subsequently. Control lines 24b are coupled to a switchable power supply 16c under the control of the element 16 for the purpose of switching the system 20 from a disabled to an enabled state in response to the detection of an alarm condition.

Where an alarm condition has been detected at a time $T_0$ the control element 16 via supply 16c, switches the plurality of voltage applied to the lines 24b to enable the alarm indicating elements of the system 20.

Coupled to the generator 22 is a communication link 24c on which is combined control signals from the lines 24a and electrical energy provided by the lines 24b. In response thereto, control pulses are generated by the generator 22. Coupled to the lines 24c are a plurality of output devices 26. The plurality 26 includes visual output devices, such as the device 26a which is intended to provide a pulsed visual indicator of an alarm condition, audible output devices, such as the device 26b which is intended to provide an audible indication of an alarm condition and combination devices 26c which include both visual and audible outputs.

One form of the system 20 is disclosed and claimed in previously issued U.S. Pat. No. 5,598,139 to Karim et al. entitled Fire Detecting System with Synchronized Strobe Lights assigned to the assignee hereof and incorporated herein by reference. As described in the '139 patent, it is useful to be able to trigger the output devices in synchronism. To this end, the pulse generator 22 interrupts the supply of electrical energy on the lines 24c and impresses a plurality of spaced apart synchronizing or strobe pulses 30 thereon.

As indicated in FIG. 1, the pulses 30 can be pulse width modulated. A first width can be used for purposes of triggering the visual indicated units 26a. Alternately, all pulses can be used for triggering the units 26a. A second width, perhaps longer, can be used for turning on and off the audible output elements of the units 26b, 26c.

Using the pulse width modulated sequences 30, the output devices 26 respond to variable width fixed frequency pulses. It will be understood that additional widths can be used to carry out other control functions.

Alternately, pulse patterns, illustrated in sequence 30a, can be used instead of pulse width modulation. In the sequence 30a, one or more pulse positions in a selected repetition period are provided for purposes of controlling various of the output devices 26. Hence, one of the pulse positions in the sequence 30a can be used repeatively to trigger or synchronize the visual output devices 26a, 26c. Another pulse position in the sequence 30a can be used to turn on the audible output devices 26b, 26c. Yet another pulse position can be used to turn off the audible output devices.

It will be understood that as many pulse positions as desired can be provided in a given time interval or period, on the order of one second for example, as are needed to carry out the desired control functions. Other types of modulation or signalling also can be used without departing from the spirit and scope of the present invention.

The modules 26 when switched from an inactive to an active state at $T_0$ are particularly advantageous in that they draw only a limited, predetermined maximum in-rush current as described in more detail subsequently. As a result of the in-rush current limiting capability of the modules 26, a larger number can be coupled to the lines 24c without having to increase the wire size of those lines nor without having to increase the rating of the power supply 16c.

FIG. 2 illustrates in block diagram form a representative module 26n which could be coupled to the link 24c and which limits in-rush current magnitude. The module 26n includes first and second terminals 40a, 40b for coupling to the lines of the link 24c.

Subsequent to time $T_0$ terminal 40a is positive relative to terminal 40b. A diode 40c disables and isolates the unit 26n when the polarity on the terminals 40a, b is reversed. Coupled to the cathode of the diode 40c is a variable impedance input circuit 42.

The variable impedance circuit 42 has an input port 42a at which it receives electrical energy, via the terminals 40a, b, an output port 42b which is coupled to a load which can include a capacitive element or component and a control port 42c. The control port 42c is in turn coupled to a local control circuit 44.

By way of illustration and not limitation, at time $T_0$ when the polarity of the terminals 40a, b reverses such that terminal 40a is positive relative to terminal 40b, the variable impedance circuit 42 exhibits a relatively high impedance, which could be primarily resistive, thereby limiting the initial in-rush charging current to the capacitor C. Over a period of time as the voltage across the capacitor C charges toward a steady state value, the in-rush current decreases toward its steady state value. Subsequently, the control circuit 44 via the port 42c switches the variable impedance circuit 42 from its high impedance state to a very low impedance state thereby effectively removing it from the circuit of the module 26n.

Switching by the control circuit 44 can take place after a predetermined elapsed period of time, for example five or six time constants of the module 26n. Alternately, the control circuit 44 can switch the circuitry 42 in response to a detected electrical parameter. For example, the control circuit 44 can monitor in-rush current or alternately the voltage across the capacitor C and in response to either such parameter switch the circuit 42 from a high impedance state to a low impedance state.

FIG. 3 illustrates in block diagram form, the combined module 26c with a variable impedance circuit 42 and control circuit 44 from FIG. 2 as described above. The module 26c also incorporates control pulse detection circuitry 50 for purposes of detecting pulses and various widths of pulse width modulated sequence 30. Alternately, the detection circuitry 50 can detect pulses at various positions in the pulse pattern of sequence 30a.

The module 26c includes trigger circuitry 43a responsive to pulses of the sequence 30 for triggering an illumination source, which could be a flash tube 43b. The module 26c also incorporates on-off control circuitry 44a which is in turn coupled to an audible output source, such as a horn, 44b.

Under control of circuit 44, and in response to the pulse width modulated sequence 30, the source 43b can be triggered on a periodic synchronized basis thereby producing synchronized light pulses. Simultaneously, the audible source 44b can be switched on and off in response to the pulse width modulated sequence 30 for purposes of generating desired audible output sequences. The audible output sequences can be synchronized with the visual source 42b or can be operated asynchronously.

Figure 4:
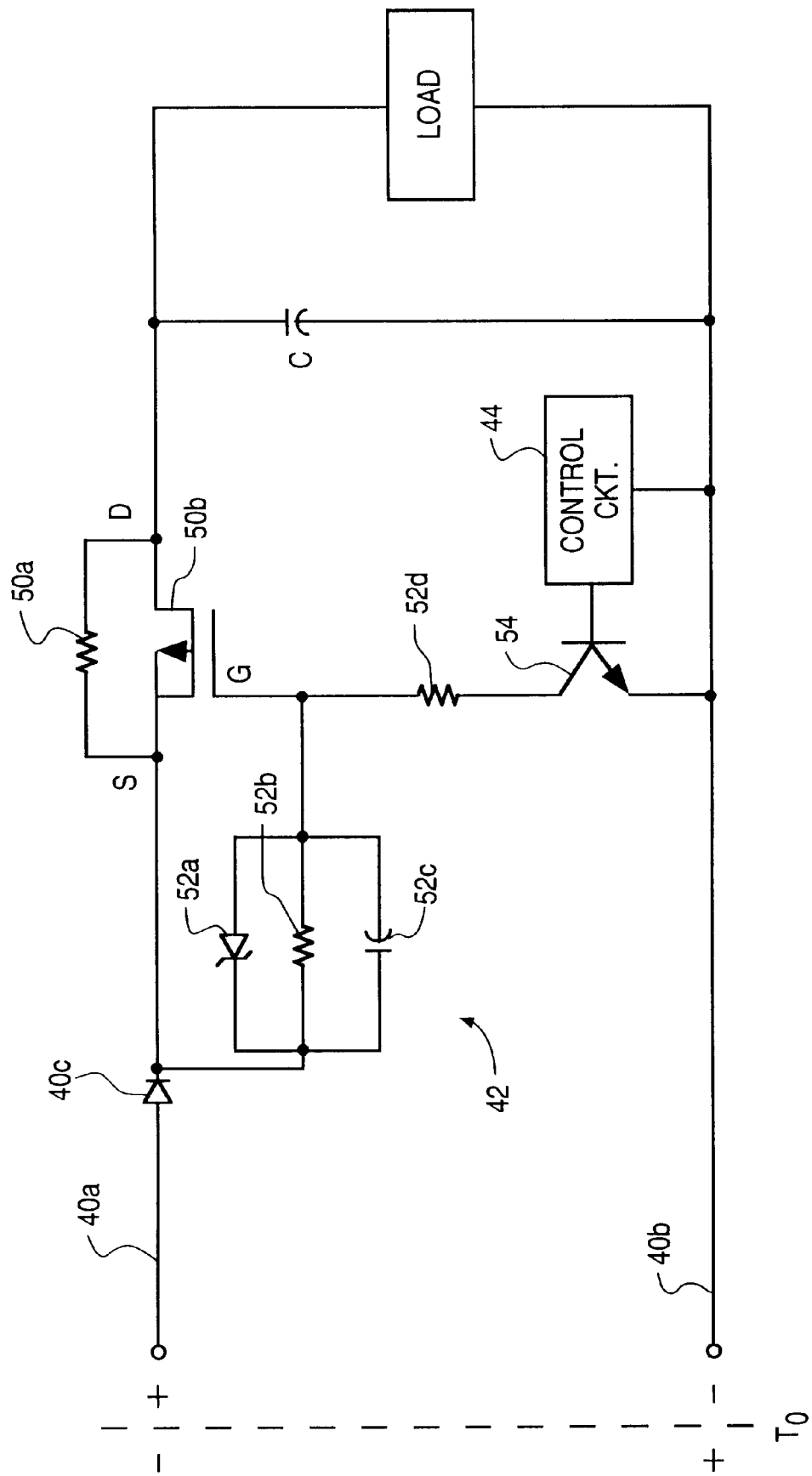
FIG. 4 is a schematic diagram of a two state variable impedance circuit.

FIG. 4 illustrates schematically a preferred form of the variable impedance circuit 42. The circuit 42 includes a fixed resistance element 50a. Coupled in parallel with the element 50a is a solid state switch 50b. The switch 50b can be implemented as a P channel MOS field effect transistor having a low source-to-gate turn on voltage. Connected between the source S and the gate G of the switching element 50b is a Zener diode 52a for establishing a source-to-gate voltage drop. The Zener diode is connected in parallel with resistor 52b and a noise suppression capacitor 52c.

The gate of the switching element 50b is coupled via a resistor 52d to a solid state switch 54. The switch 54 is in turn coupled to the control circuit 44.

In response to the control circuit 44 having detected the predetermined condition, either a time-out or a selected electrical parameter achieving a predetermined value, transistor 54 is caused to conduct which in turn via Zener diode 52a and voltage divider 52b, d places approximately 6 volts across the source-of-gate of the switching element 50b thereby causing that element to assume a low impedance state. In this condition, the resistor 50a no longer affects operation of the module.

Figure 5:
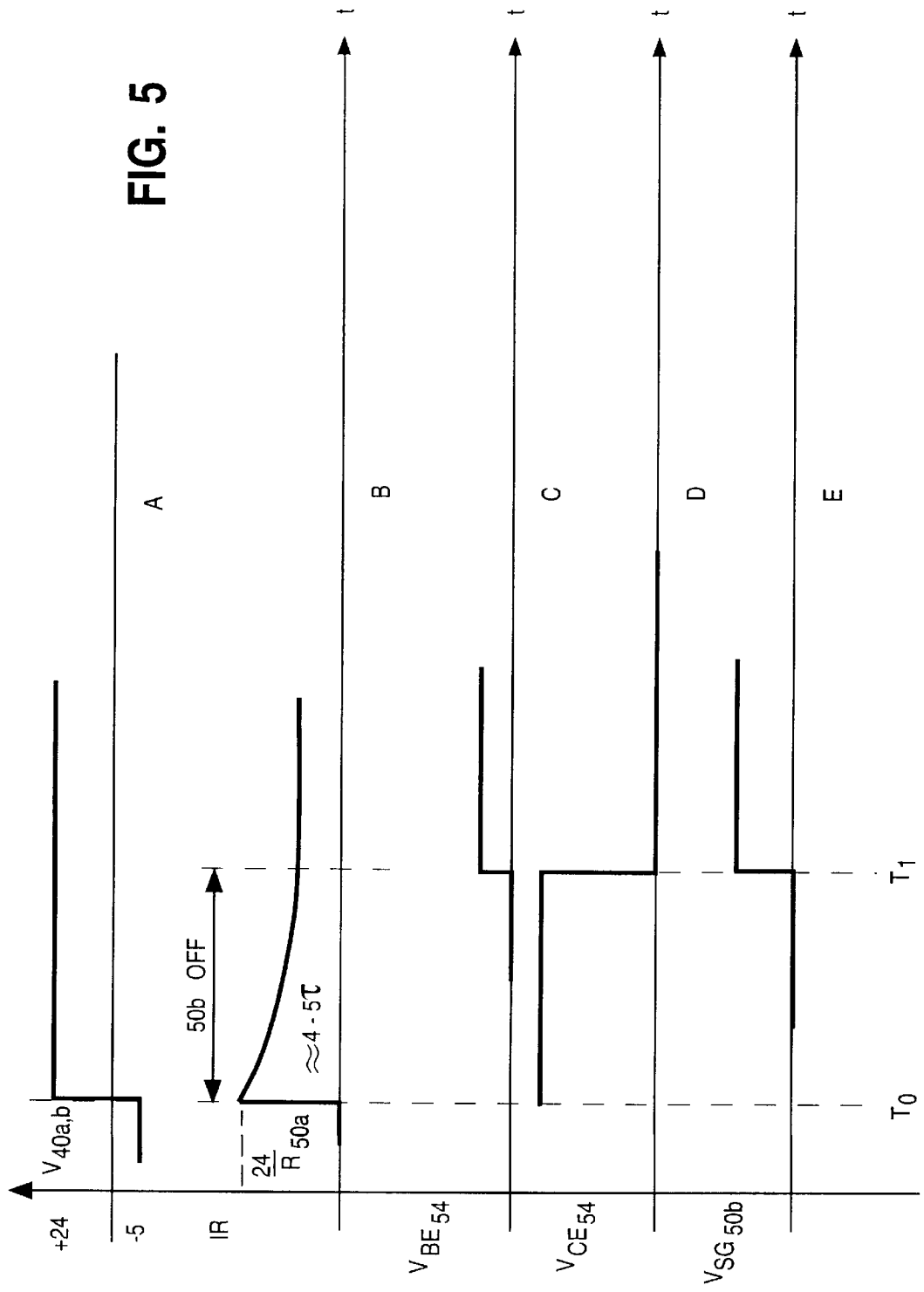
FIG. 5 is a timing diagram illustrating operation of the circuitry of FIG. 4.

FIG. 5 illustrates operation of the circuitry of FIG. 4 by a series of graphs. In particular, Graph B illustrates the turn-on current at $T_0$ being limited in maximum magnitude to the current flow permitted by the impedance element 50a. In the event that the applied voltage is on the order of 24 volts, the maximum in-rush current will be limited to 24Ma (assuming resistor has a 1KΩ value). Subsequently, the line current decreases toward a steady state value for the module as the capacitor C is charged.

At time $T_1$, about 4–5 time constants ($R_{50a}$*(C+ any other capacitance)) the local control circuit 44 switches transistor 54 on thereby causing switch 50b to assume a low impedance state. In this latter state, the resistive element 50a does not affect module operation.

It will be understood that instead of a parallel, switched branch, the circuit 42 could be implemented with a single switched, multi-impedance branch. alternately, it could be interconnected other ways in the module without departing from the spirit and scope of the present invention.

It will also be understood that control circuit 44 could include a programmed processor. The circuit 44 could implement a time-out in hardware or software. The circuit 44 could also include voltage and/or current sensors.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A condition responsive impedance altering circuit comprising:

first and second terminals;

a first impedance branch coupled between the terminals;

a second, variable, impedance branch coupled between the terminals; and control circuitry coupled to at least the second branch wherein the control circuitry varies the impedance of the second branch between a first, relatively high, impedance value and a second relatively low, impedance value in response to a selected condition wherein the control circuitry includes a timing element and in response to a predetermined elapsed time varies the impedance of the second branch.

2. A circuit as in claim 1 wherein one of the terminals is adapted to be coupled to an electrical unit with a capacitive input impedance, in part, and wherein the other is adapted to receive electrical energy to power the unit with an input impedance between the terminals substantially established by the first branch when electrical energy is first applied and, subsequently, in response to the selected condition, is substantially established by the second branch.

3. A circuit as in claim 2 wherein the second branch includes a solid state switch.

4. A circuit as in claim 1 wherein the control circuitry detects the selected electrical condition at one of the terminals and varies the impedance of the second branch in response thereto.

5. A module with a predetermined turn-on electrical current comprising:

a load;

a control element coupled to the load;

a multi-state impedance altering circuit coupled at least to the load and the control element wherein when electrical energy is first applied to the module, the circuit exhibits a first impedance thereby limiting the turn-on current to a predetermined maximum value and wherein after a preset time interval the circuit exhibits a second impedance.

6. A module as in claim 5 which includes first and second terminals and wherein the circuit is coupled between one of the terminals and the load.

7. A module as in claim 6 wherein the circuit includes first and second branches and wherein one of the branches includes a solid state switch.

8. A module as in claim 6 wherein the load includes a triggerable light source.

9. A module as in claim 8 wherein the load includes demodulation circuitry for responding to one of pulse width modulated and pulse position modulated control signals.

10. A condition responsive input impedance altering circuit couplable to an input port of an electrical unit comprising:

first and second terminals wherein one of the terminals is couplable to the input port;

a controllable, variable impedance circuit coupled between the terminals wherein the circuit includes a control port and exhibits first and second impedances value in response to signals applied to the control port;

a programmable control element coupled to the control port wherein in response to the application of electrical energy to the unit, the control element applies a first control signal to the control port thereby causing the variable impedance circuit to exhibit the first impedance and in response to detection of an elapsed time interval subsequent to the application for electrical energy, the control element applies a second control signal to the control port thereby causing the variable impedance circuit to exhibit the second impedance.

11. A circuit as in claim 10 wherein the first impedance was a value a predetermined amount greater than the value of the second impedance, wherein the first impedance value is adapted to limit to a predetermined peak value, a transient initial current flow into the unit in response to the application of electrical energy.

12. A circuit as in claim 11 wherein the circuit includes a fixed impedance branch and a variable impedance branch coupled thereto.

13. A circuit as in claim 12 wherein the branches are coupled in parallel.

14. A circuit as in claim 12 wherein the fixed impedance branch includes a fixed resistor.

15. A circuit as in claim 12 wherein the variable impedance branch includes a solid state switch.

16. An ambient condition monitoring system comprising:

a control element;

a power supplying communications link coupled to the control element;

at least one alarm indicating output device coupled to the link wherein the output device includes multiple state peak current limiting circuitry and wherein the output device includes circuitry which responds to one of received pulse width modulated control signals and received pulse position modulated control signals.

17. A system as in claim 16 which includes at least one ambient condition detector coupled to the control element and wherein the control element includes commands for establishing that a potential alarm condition exists in the vicinity of the detector and for supplying electrical energy to the link to energize the output device.

18. A system as in claim 16 wherein the output device includes a source of output, alarm indicating, radiant energy.

19. A system as in claim 18 wherein the output device includes an audio output transducer.

20. A system as in claim 16 wherein the current limiting circuitry includes a fixed impedance portion and a variable impedance portion.

21. A system as in claim 20 wherein the portions are connected in parallel.

22. A system as in claim 21 wherein the control element switches the variable impedance portion from a first state to a second, lower impedance, state in response to an electrical signal.

23. A system as in claim 16 wherein the multiple state peak current limiting circuitry changes state in response to passage of a predetermined time interval.

24. An alarm output device comprising:

a visual output device;

a control circuit coupled to the output device;

a variable impedance turn-on current limiting circuit coupled to the control circuit wherein the current limiting circuit is adapted to switch from a first impedance state to a second impedance state in response to an elapsed time interval.

25. An output device as in claim 24 which includes an audible output device coupled to the control circuit.

26. An output device as in claim 24 wherein the control circuit includes a programmed processor.

27. An output device as in claim 24 wherein the control circuit includes trigger circuitry for energizing the output device in response to received synchronizing pulses.

28. An output device as in claim 25 wherein the control circuit includes trigger circuitry for energizing the audio output device in response to received control pulses.

29. An output device as in claim 28 wherein the control circuit includes circuitry for disabling the audible output device.

30. An output device as in claim 24 wherein the control circuit includes elapsed time detection circuitry.

31. An output device as in claim 24 wherein the control circuit includes demodulation circuitry for responding to at least one of pulse width modulated control signals and pulse position modulated control signals.

32. An output device to be switched from an inactive state to an active state in response to switching the polarity of an applied input voltage comprising:

a timing circuit, responsive to switching the polarity for timing out the duration of a preselected time interval;

a multi-state impedance network with a control port coupled to the timing circuit, an input port for receiving applied input voltage and an output port; and an output transducer coupled to the output port and including circuitry for responding to pulse modulated control signals.

33. A device as in claim 32 which includes a second different output device.

\* \* \* \* \*